Patented Feb. 7, 1950

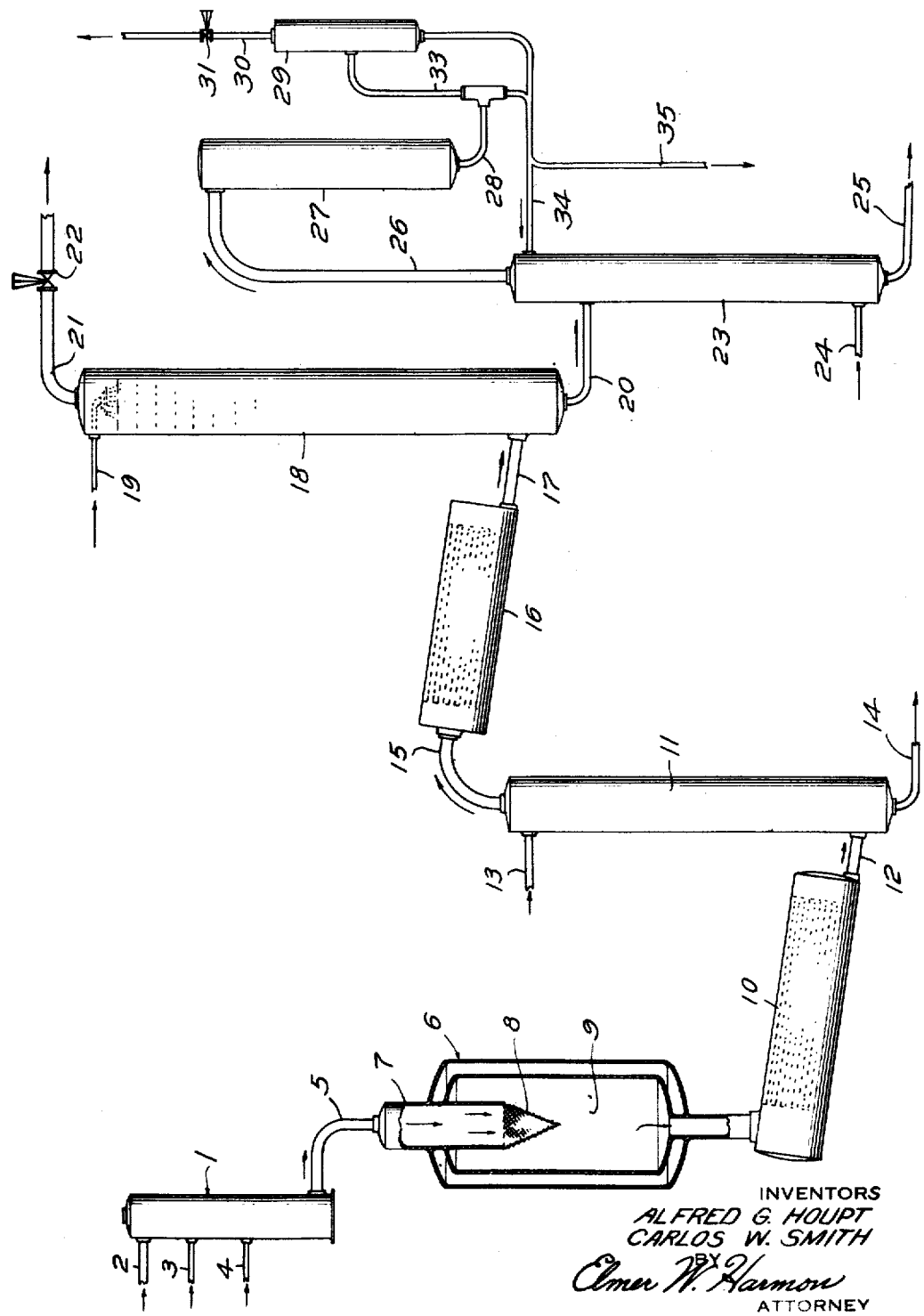

2,496,999

UNITED STATES PATENT OFFICE 2,496,999

PRESSURIZED REACTION OF AMMONIACAL GASES TO HCN

Alfred Gordon Houpt, Stamford, and Carlos William Smith, Cos Cob, Conn., assignors to American Cyanamid Company, New York, N. Y., a corporation of Maine Application April 24, 1947, Serial No. 743,593

4 Claims. (Cl. 23—151)

This invention relates to the production of hydrocyanic acid. More particularly, it relates to a process of preparing hydrocyanic acid by ammonia oxidation. Still more specifically, the invention relates to the production of hydrocyanic acid by the catalytic reaction in the vapor phase of a mixture comprising ammonia, a hydrocarbon and oxygen.

Production of hydrocyanic acid for industrial use has been accomplished in many different ways. Because of the commercial importance of the product, various additional processes have been proposed using novel or more readily-available raw materials. Although they represent attempts to lower production costs, for various reasons none of these latter proposals as yet have proved to be wholly successful.

One such proposal was to react a gas mixture comprising ammonia, a gaseous or vaporized hydrocarbon, and the requisite amount of oxygen. The mixture, at or below atmospheric pressure, was to be subjected to combustion in the presence of a suitable catalyst, preferably a metallic platinum-iridium alloy, although other noble metals and alloys were suggested. The hydrocyanic acid content of the combustion products was then to be separated therefrom.

Theoretically the operation of such a process would appear to offer a number of commercial advantages. Readily-available and relatively inexpensive starting materials are utilized. Further, such a reaction would appear to be capable of being readily carried out with available, relatively simple apparatus. In attempted practice, however, such appearances proved to be wholly deceptive. Many difficulties, generally unexpected, were encountered.

One of the more serious drawbacks to the proposed process was found to be the extreme difficulty in separating unreacted ammonia and product HCN from the reacted mixture. Both, for example, are highly soluble in aqueous media. Yet it is extremely important that unchanged ammonia, inevitably present in the products, be promptly and completely removed. Ammonia has a definite intrinsic value which must be recovered. Further, if not promptly removed, in subsequent operations it induces a direct loss of HCN by decomposition and/or polymerization to a black tarry mass, largely azulmic acid. The latter so thoroughly clogs the system as to make sustained continuous operation impossible.

The problem was found to be further complicated by the fact that conversion of ammonia to HCN, based on ammonia destroyed, is not only lower than expected but too low for desirable operation. At reaction temperature, which may reach 1000° C. or higher the gas volume to be handled is large. In addition, solvent absorption of the unreacted ammonia and the product HCN resulted in dilute solutions, requiring the handling of excessive fluid volumes. Particularly is this true in the case of the HCN absorption, in which aqueous solutions containing only about 1–2% were found to be obtained in average practice.

Cooling the reacted vapor phase products was found helpful in reducing the volume of gas which had to be handled. On the other hand, cooling could not be carried too far, as will be brought out, since the unchanged ammonia must be first absorbed in a suitable fluid at a temperature sufficiently high that the HCN taken up in the fluid during $NH_3$ absorption operation is maintained at a minimum.

Further, reduction of the gas volume by compression prior to ammonia absorption is wholly impractical. Attempts to do so resulted in complete failure of the compressor by clogging with the tarry mass mentioned above. Neither, were attempts at compression of the gases after ammonia removal successful. Aqueous HCN and gas or vapor mixtures containing HCN and $H_2O$, particularly near the dew point, are highly corrosive to most metals and alloys. As a result, failure of the pumps by corrosion always occurred. Compressors resistant for any extended period to corrosive attack by these materials handled were not available.

Nevertheless, if a procedure capable of overcoming these difficulties, i. e., the handling of excessive gas volumes, with clogging, with corrosion, in obtaining low concentrations in the absorbing fluids, and of being incapable of extended continuous operation, could be developed, such a process would be highly attractive for further development. However, satisfactory solutions to these problems were not found to be available in the art.

It is, therefore, the principal object of the present invention to develop a process adaptation which is not subject to the principal objections noted above. In addition to improving the productivity of the process by overcoming these problems, it is a further object to devise a procedure which may be readily carried out with a minimum of manual supervision, which will require a minimum of special apparatus and which is sufficiently certain in operation to produce commercially-reliable results.

Surprisingly, the objects of the present invention have been attained by placing the whole mixture of gases to be reacted under superatmospheric pressure prior to reaction. This not only eliminates the previous troublesome compression problems but even more surprisingly produces an increase in the ratio of HCN produced to $NH_3$ destroyed. This latter result is quite astonishing in view of the fact that at final equilibrium conditions, there should be little or no HCN in the reaction products. In the past it has been thought necessary in order to prevent reaching this state to operate at pressures not exceeding atmospheric. Wholly contrary to this well-formed opinion and to the art based thereon, the present process is not only operable, but operates to so increase the productivity that the process is well adapted to plant scale operation.

In further discussing the present invention, it is necessary to bear in mind that an essential feature is that the whole process is carried out under pressure. In discussing the present invention, it will be helpful also to consider the accompanying drawing, which indicates by a simplified diagrammatic representation the flow sheet of the present process. Referring to the drawing, it will be seen that the process may be considered as roughly divided into three operations: (1) mixing and reacting the gaseous or vaporized reactants; (2) removal of any unchanged ammonia and (3) isolation and purification of the HCN product.

In operating the process of the present invention it is desirable in prolonging the useful life of the catalyst gauze that the gaseous reactants be freed so far as possible from dust, particularly any iron rust. To accomplish this, the gaseous reactants are usually introduced into a suitable mixer-filter 1, of conventional design, under pressure from some suitable source. This may be a pressurized storage system or the pressure may be applied by suitable compressors as the materials are fed to the mixer-filter. Consequently, the source of the reactants and the exact way in which they are placed under pressure forms no part of the present invention. For illustrative purposes, the oxygen reactant may be considered as introduced into the mixer-filter through a suitable conduit 2; the hydrocarbon component through a suitable conduit 3 and the ammonia component through a suitable conduit 4. The mixed, dust-freed reactants are taken from the mixer-filter 1 through a suitable conduit 5 to a reactor generally designated 6.

The particular reactor used may take any of a number of conventional forms. Preferably, as indicated in the drawing, the gaseous reactants are introduced into a chamber 7 separated from the remainder of the reactant and connected therewith through a gauze catalyst body 8. The reactants are suitably ignited, reaction taking place during or immediately after passage through the catalyst and the reaction products being accumulated in a second chamber 9 in reactor 6.

The reacted mixture leaving reactor 6 will inevitably contain unchanged ammonia. If it is not removed from the mixture as rapidly and completely as possible, as noted above, there is considerable loss of potential HCN product and clogging of the apparatus. A good procedure for removing the ammonia is to absorb the latter in an aqueous solution of a salt-forming acid, usually sulfuric acid. Because the ammonia is taken up as a salt, absorption can be carried out at a temperature such that the solubility of HCN in the absorbing liquid is low.

Gases leaving reactor 6 are too hot, ranging from 850°–1200° C., for effective absorption even in the acid solution. Consequently, they are cooled in a suitable cooler 10 before being passed to an ammonia absorber 11. One precaution should be taken to prevent condensate forming and/or collecting in the cooler and the dissolution of ammonia and/or HCN therein. The low point in the cooling system should be the point of entry of gas into ammonia absorber 11. Reacted gases enter absorber 11 at a low level therein through a suitable conduit 12. The aqueous salt-forming acid solution is introduced at a higher level through conduit 13 from any suitable source. Used absorbing liquid containing the ammonia, as a salt thereof, is drawn from the bottom of absorber 11 through conduit 14. It is normally sent to some recovery system, whereby the ammonia salt is recovered. The absorption fluid is preferably recycled. Ammonia-free gas passes from the absorber through conduit 15.

Because the ammonia absorber is operated at sufficiently high temperature that HCN is only slightly soluble in the absorbing liquid, gases leaving the ammonia absorber are too hot for effective absorption of the HCN content thereof. They are, therefore, passed through a suitable cooler 16 in which the gas temperature is reduced to a level for effective absorption, usually about 50°–60° F., or less. From cooler 16, cooled gases pass through conduit 17 to an HCN absorber 18 in which the HCN content of the gas mixture is taken up in a countercurrent flow of cold water entering one end of the HCN absorber through conduit 19 and leaving the other as HCN solution through conduit 20. The insoluble residual gases, after HCN absorption, are vented to the atmosphere through a suitable vent 21, equipped with a back-pressure controller 22.

HCN solution through conduit 20 is introduced into a suitable stripping tower 23. Steam for stripping is introduced through conduit 24 and stripped bottoms are drawn off through a suitable conduit 25. Pressure thereon may be reduced in any suitable way after withdrawal. HCN vapors leaving the stripper through conduit 26 are subjected to condensation as by condenser 27. Condenser 27 is equipped with a vent-line 28 which in turn is equipped with a conventional vent-condenser 29; the latter being in turn vented to the atmosphere through conduit 30, the latter also being equipped with a back-pressure controller 31. Liquid HCN, as the condensate, leaves condenser 27 through conduit 32 and is admixed with any condensate from vent-condenser 29 drawn from the latter through conduit 33. Part of the condensate is returned as reflux to stripper 23 through conduit 34 and the remainder is drawn off as product through conduit 35. Again pressure may be reduced in any desired way, as by blow tanks or the like, the particular method forming no part of the present invention.

Operation of the process is believed to be apparent from the foregoing discussion. In passing, several points may well be noted. For example, while the source of oxygen may be air, oxygen or oxygen-enriched air may be used. Using such material the operator has the advantage of being obliged to handle less inert gas. On the other hand, economy of operation usually favors the use of air so that the latter is generally to be preferred.

The hydrocarbon reactant also may be considerably varied. In ordinary operation it is, preferably, a permanent gas such as methane, ethane, propane or the like. Operation, however, is not so limited. If so desired, a heavier, volatilized, volatilizable hydrocarbon or a mixture of hydrocarbons may be utilized by providing a suitable method of heating. It is not necessary that the hydrocarbon be pure since, as noted, a mixture may be used. It is, however, definitely preferable that the hydrocarbon be saturated. Natural gas mixtures, being rich in the lower saturated hydrocarbons, are excellent for the purpose.

As was noted above, the hydrocarbon need not be pure methane. However, using hydrocarbons having a lower hydrogen-carbon ratio than methane will increase the oxygen requirement. For example, assuming the ammonia to hydrocarbon ratio is maintained in the preferred range of about 0.9–1.0:1; the use of natural gas mixtures containing considerable ethane or propane may increase the optimum oxygen-hydrocarbon ratio to as high as 1.6–8:1. It may go even higher if the ethane or propane content exceeds 50–60%.

There is also some relationship between the proportions of the gases in the mixture fed and both the temperature of reaction and the velocity over the catalyst. The effect of varying the proportion of air, as the oxygen source, is of principal importance. This, in addition to affecting gas velocity directly, affects the temperature which in turn also affects the gas velocity. This gas velocity, calculated at reaction temperature and pressure, should not fall much below about 4 feet per second. Otherwise, there is danger of back-firing. On the other hand, velocities above about 15–20 feet per second result in decreased utilization of the ammonia. If preferred, these velocities may be expressed as if calculated for standard temperatures and pressures. In that case the minimum will be about 1.0 foot per second and the maximum about 4–5 feet per second.

Of equal, if not greater, importance with the rate of gas feed, as a control of gas velocity over the catalyst, is the question of operating pressure. The actual pressure used may be varied within quite wide limits. Any pressure above atmospheric appears to produce improved results, this being, as noted above, contrary to expectation. Pressures of at least 5–10 pounds above atmospheric are definitely desirable. On the other hand, while increasing the pressure on the system to as high as about 40–50 pounds per square inch above atmospheric produces better results than at atmospheric pressure, pressures above about 20–30 pounds per square inch do not appear to produce sufficiently improved results to warrant the increased cost of compression.

The limitations on choosing the proportions of the materials to be reacted are not wholly critical. Nevertheless they must be held within certain limits. A plurality of reactions are carried out simultaneously. Because the reaction to produce HCN is endothermic, there must be at least enough oxygen and hydrocarbons for combustion in the exothermic reactions to maintain the necessary temperature and to prevent deposition of carbon on the catalyst. On the other hand, unnecessarily large amounts of oxygen tend to promote reaction to the equilibrium products $CO_2$, $H_2O$ and $N_2$.

There are, within these limits, operating ranges which produce optimum results. For purposes of illustration, considering the oxygen and hydrocarbon as equivalents of $O_2$ and $CH_4$, the minimum $O_2$-$CH_4$ ratio will be from about 1.1–1.2:1 using an approximation of the optimum amount of ammonia. On the same basis, the upper limit will be around 1.4–1.5:1. Higher yields of HCN from ammonia will be obtained with lower ratios of ammonia to hydrocarbon. However, in practical operation this ratio should be maintained at about 0.8–1.2:1, preferably averaging in the general vicinity of 0.9–0.95:1.

The overall reaction is exothermic, producing a marked temperature rise which may bring the temperature of the reacted mixture to as high as about 1000° C. in the combustion-products chamber 8 of reactor 6. As a result, it is usually desirable to provide some means for protecting the reactor as by a refractory lining and/or water cooled jacketing. An excellent reactor structure is disclosed and claimed in the copending application for U. S. Letters Patent, Serial No. 743,595, filed of even date by Alfred G. Houpt, one of the present inventors. However, other apparatus for the purpose may be employed if so desired.

Similarly, the gauze structure may be varied as may be desired. We prefer a conical structure as shown in the drawing, an excellent structure for the purpose being shown in the copending application for U. S. Letters Patent, Serial No. 743,591 of Alfred G. Houpt, filed of even date.

In carrying out the ammonia absorption, it is desirable, as was noted, to keep the HCN absorption as low as possible. For this purpose, the ammonia absorption is carried out at a suitably high temperature. Under operating conditions, the boiling point of the used absorbing liquid leaving the ammonia absorber will be effected by the pressure in the absorber and the temperature and amount of absorbing liquid circulated. Absorption should not be carried out at temperatures which cause the used liquor to exceed about 25°–35° F. less than its boiling point. Otherwise, excessive amount of water vapors will be freed and sent into the rest of the system. Control of the temperature of absorption is easily accomplished by holding the other factors constant and varying the amount of cooling water circulated in the primary cooler 10. A good general practice will find the ammonia absorption being carried out at from about 175°–225° F.

As a practical precaution, although it is not illustrated in the drawing, it is usually advisable to provide a water-washing of the ammonia-free gas before passing it into the secondary cooler 16. Otherwise, acid and/or ammonia salt-containing liquor may be carried over by entrainment into the remainder of the apparatus. Where the water-washing operation is used, it, too, should be carried out at a fairly high temperature to keep HCN absorption in the wash-water to as low a level as possible. As an actual matter this is fairly easily accomplished because of the residual sensible heat in the ammonia-free gases and the temperature at which they leave the ammonia absorber.

The effect of pressure on the conversion rate may be illustrated by the following tests, which are indicated as illustrative only.

EXAMPLE

Air and methane gas in the ratio of about 6:1 were combined with ammonia in an $NH_3$-$CH_4$ ratio of about 0.9:1.0; passed over a platinum-iridium gauze catalyst and ignited. The reaction products were collected, the unreacted ammonia recoved by absorption in hot 6% aqueous sulfuric acid and the ammonia-free HCN taken up in cold water. The pressures, velocity and conversion rates are shown in the following table from which it will be apparent that the use of pressure on the system not only is operable to overcome the necessity for compressing the gases after reaction but also has a highly beneficial effect on the reaction itself despite the expected contrary result.

Table

| Volume Ratio $O_2:CH_4$ | Pressure, #/sq. in. (above atm.) | Gas Velocity, ft./sec. (STP) | $NH_3$ Utilization | | | HCN Yield Net percent |
|---|---|---|---|---|---|---|
| | | | Recovery percent $NH_3$ | Conversion percent to HCN | Decomp. percent Loss | |
| 1.20 | 1.2 | 1.67 | 19.6 | 62.5 | 17.9 | 77.7 |
| 1.25 | 8.6 | 1.74 | 17.5 | 65.9 | 16.6 | 70.9 |
| 1.29 | 13.0 | 1.75 | 17.4 | 67.2 | 15.4 | 84.6 |
| 1.26 | 22.1 | 1.75 | 21.5 | 68.5 | 10.0 | 87.3 |
| 1.31 | 29.3 | 1.68 | 25.9 | 64.1 | 10.0 | 86.5 |

We claim:

1. In the production of hydrocyanic acid by the catalytic reaction in the vapor phase of gaseous ammonia, oxygen and a hydrocarbon and isolating the HCN content of the combustion products; the improved procedure which comprises admixing the feed gases under pressures of from about 5 to 50 pounds per square inch above atmospheric and at temperatures not exceeding about 300° C.; passing the mixture over a catalyst body; igniting the mixture immediately after passing the catalyst, whereby the mixture burns and the catalyst is heated; adjusting the feed rate to maintain catalyst temperature at about 850°–1200° C.; cooling the reacted gases to about 175°–225° F.; selectively absorbing the unchanged ammonia in the reacted mixture; cooling the residual gases to about 35°–75° F.; absorbing the HCN content in aqueous fluid and venting the residual undissolved gases from the system; stripping the HCN content of the resultant HCN solution; condensing the HCN vapors to liquid HCN; collecting the condensate and reducing the pressure on the condensate to atmospheric.

2. A process according to claim 1 in which for the volume of gaseous reactants to be handled, the operating pressure is adjusted to produce a velocity over the catalyst of from about one to about five feet per second, calculated at standard conditions of temperature and pressure.

3. A process according to claim 1 in which the oxygen is supplied as a member selected from the group consisting of air, oxygen enriched air, and oxygen.

4. A process according to claim 1 in which the hydrocarbon is a mixture comprising essentially $CH_4$, $C_2H_6$ and $C_3H_8$.

ALFRED GORDON HOUPT.
CARLOS WILLIAM SMITH.

REFERENCES CITED

The following references are of record in the file of this patent:

UNITED STATES PATENTS

| Number | Name | Date |
|---|---|---|
| 2,000,134 | Harris | May 7, 1935 |
| 2,069,545 | Carlisle | Feb. 2, 1937 |
| 2,083,824 | Bond | June 15, 1937 |